June 14, 1955  B. BARÉNYI  2,710,770
PASSENGER MOTOR VEHICLE HAVING SEPARABLE
END SECTIONS SHAPED ALIKE
Filed Jan. 31, 1950
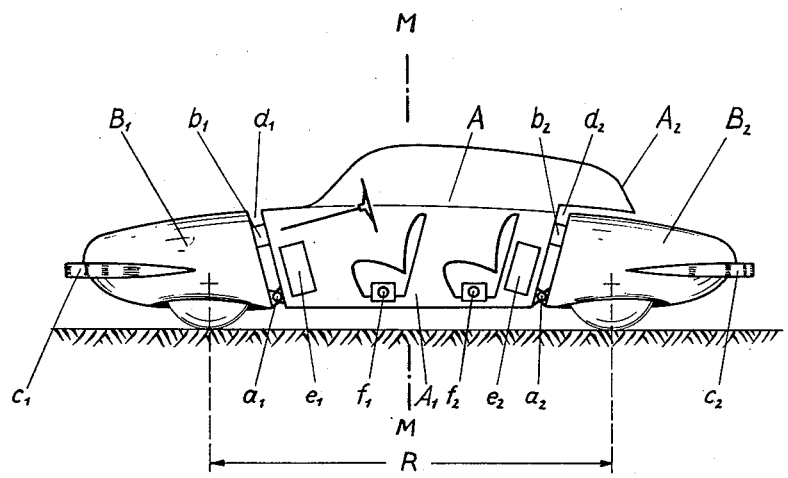
Inventor
Béla Barényi
By Diche and Padlon
Attorneys

United States Patent Office 2,710,770
Patented June 14, 1955

2,710,770

PASSENGER MOTOR VEHICLE HAVING SEPARABLE END SECTIONS SHAPED ALIKE

Béla Barényi, Stuttgart-Rohr, Germany

Application January 31, 1950, Serial No. 141,397

Claims priority, application Germany
February 1, 1949

1 Claim. (Cl. 296—28)

This invention relates to a motor vehicle which is made according to the so-called cell or multi section or compartment system.

It is a primary object of the present invention to simplify the manufacture of vehicles made according to the cell system, and thus to increase the economy, more particularly as regards the manufacture, assembly, repairs and the number of parts to be carried in stock.

The vehicles now commonly in use, have car bodies of an intricate shape, and cause very high production costs, since each part of the wall of the vehicle requires special manufacturing equipment according to its special shape. Apart from the high cost to be invested therefor, more particularly for pressing and welding machines, valuable floor space and an unnecessarily great number of workmen are required. More particularly the repair of the vehicles is rendered difficult. Moreover, so large a number of spare parts is ordinarily required that it is impracticable, at least for the smaller repair shop, to carry complete sets of spare parts in stock.

In order to avoid these drawbacks, a motor vehicle according to the present invention is designed in such a way that the number of parts is reduced to a minimum and that the car body is composed of parts which are as uniform as possible and of a moderate size. One feature of the present invention therefore consists in that in a motor vehicle, more particularly in a passenger car made according to the cell-system and consisting of a central cell and two end cells, the end cells are designed and arranged symmetrically with respect to a transverse plane disposed at right angles to the longitudinal direction of the vehicle located in the middle between the axles of the vehicle, with equal longitudinal and transverse profiles, and in that the connections of the end cells to the middle cell, which are advantageously provided with separating joints inclined towards the ends of the vehicle, are formed symmetrically and are interchangeably similar. Moreover, according to a further feature of the present invention the lower part of the middle cell comprising the connecting points for the end cells, more particularly the end, side, and bottom walls thereof, are designed symmetrically with respect to the transverse middle plane. The upper part of the middle cell may overlap the rear cell at one side thereof and is connected to the securing means of the lower part which are arranged and formed symmetrical with respect to the transverse middle plane and made interchangeably equal. Moreover, it is contemplated to provide an interchangeable arrangement of the trunks, the seats and the accessories of the end cells of the car body.

The present invention will be better understood by reference to the following detailed description taken in connection with the accompanying drawing which shows a diagrammatic sectional view of a passenger car having the invention applied thereto. Said car comprises a middle cell A, a front cell $B_1$ including the two front wheels, and a rear cell $B_2$ including the two rear wheels. The front cell $B_1$ and the rear cell $B_2$ are equal with each other as regards their longitudinal and cross sectional profile or as regards their size and shape of the contours and are arranged symmetrically with respect to the cross or transverse middle plane M—M disposed perpendicularly with respect to the longitudinal direction and bisecting the wheel base R. Correspondingly equally and symmetrically arranged and formed are the connecting means between the end cells and the middle cell, e. g., one transverse lower hinged joint $a_1$ or $a_2$ each and one upper longitudinal support $b_1$ or $b_2$ each. The same applies, for instance, as to bumpers $c_1$ or $c_2$, as to the searchlight, the number plate or the like.

The middle cell A is composed of a substantially symmetrical lower part $A_1$ and an upper part $A_2$ comprising the non-symmetrical part of the structure which overlaps the rear cell $B_2$, while the connecting means between the upper part and the lower part are also advantageously constructed and arranged symmetrically. In that manner it is possible, in spite of the substantially symmetrical construction of the vehicle, to give the same a non-symmetrical outer shape with respect to the transverse middle plane which is advantageous, for instance, for the design of the inner space, by confining the non-symmetry substantially to the upper part of the middle cell, i. e., to a relatively small part of the car. The lower part, i. e., more particularly its two end walls, the two side walls with the doors and the bottom, on the other hand, are advantageously designed perfectly symmetrically with respect to the middle cross or transverse plane M—M. According to a special feature the trunk compartments, for instance for three trunks each, are arranged at the two end walls of the lower part of the middle cell as shown. They have equal dimensions and are symmetrically arranged, so that the trunks $e_1$ or $e_2$ can be mutually interchanged at will. The seats are supported by bearers $f_1$ or $f_2$, so as to be also interchangeable, the bearers being longitudinally slidable on the walls of the car body.

The construction according to the present invention renders it possible to use the same manufacturing equipment for the front and rear part of the vehicle or for all parts of the vehicle which are arranged or designed symmetrically or interchangeably equal so that primarily the tools and machines for punching, pressing, welding or other working of the walls of the car body as well as the assembling and repair equipment can be reduced to a minimum. Large pressed pieces which are difficult to make and particularly expensive are avoided. The number of components required can be kept small and standardized to a large extent, whereby again the manufacturing cost is minimized by reducing the number of machines and the required floor space, and by better utilization of the manufacturing and assembling equipment; also continuous production is rendered possible or made more economical. Simple repair plants and small stocks of spare parts are also rendered possible as a result of the construction according to the present invention.

While the present invention has been described in detail with respect to a presently preferred example and embodiment of the present invention, it will be understood by those skilled in the art after understanding the present invention, that various changes and modifications may be made without departing from the spirit and scope of the invention and it is intended, therefore, to cover all such changes and modifications in the appended claim.

Having thus described my invention, I claim as new and desire to secure by Letters Patent:

A passenger motor vehicle comprising a self-enclosed middle cell and a pair of readily replaceable end cells spaced from said middle cell by a gap and each forming a self-enclosed unit, the lower part of said middle cell being symmetrical with respect to the central transverse plane of the vehicle, and the upper part of said middle cell enclosing the passenger compartment and being asymmetrical with respect to said transverse plane, said end cells being formed symmetrically with respect to said transverse plane and having identical body coverings, connecting means intermediate said end cells and said middle cell for connecting said end cells with said middle cells, said means being arranged symmetrically with respect to said transverse plane and developed of equal interchangeable size, the rear end of the asymmetric upper part of said middle cell extending freely beyond the gap between said middle cell and over a substantial part of the rear end cell and projecting horizontal over and beyond the adjacent part of said rear end cell.

References Cited in the file of this patent

UNITED STATES PATENTS

| | | |
|---|---|---|
| 1,953,515 | Smith | Apr. 3, 1934 |
| 2,128,930 | Fageol et al. | Sept. 6, 1938 |
| 2,425,948 | Lucien | Aug. 19, 1947 |

FOREIGN PATENTS

| | | |
|---|---|---|
| 550,603 | Great Britain | Jan. 15, 1943 |
| 597,966 | Great Britain | Feb. 6, 1948 |
| 893,936 | France | Nov. 14, 1944 |

OTHER REFERENCES

Serial No. 368,684, Barényi (A. P. C.), published May 25, 1943.